US011631035B2

(12) United States Patent
Schuster et al.

(10) Patent No.: US 11,631,035 B2
(45) Date of Patent: Apr. 18, 2023

(54) GAP-AWARE MITIGATION OF GRADIENT STALENESS (71) Applicant: Technion Research & Development Foundation Limited, Haifa (IL)

(72) Inventors: Assaf Schuster, Haifa (IL); Saar Barkai, Haifa (IL); Ido Hakimi, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 17/773,917

(22) PCT Filed: Nov. 5, 2020

(86) PCT No.: PCT/IL2020/051154
§ 371 (c)(1),
(2) Date: May 3, 2022

(87) PCT Pub. No.: WO2021/090323
PCT Pub. Date: May 14, 2021

(65) Prior Publication Data
US 2022/0351079 A1 Nov. 3, 2022

Related U.S. Application Data (60) Provisional application No. 62/930,633, filed on Nov. 5, 2019.

(51) Int. Cl.
*G06N 20/00* (2019.01)
(52) U.S. Cl.
CPC ................ *G06N 20/00* (2019.01)

(58) Field of Classification Search
CPC ................. G06N 20/00; G06N 3/08
See application file for complete search history.

(56) References Cited

U.S. PATENT DOCUMENTS

2013/0290223 A1* 10/2013 Chapelle ............... G06N 20/00
706/12
2019/0244135 A1 8/2019 Melamed et al.
(Continued)

FOREIGN PATENT DOCUMENTS

WO  WO 2019/042571  3/2019

OTHER PUBLICATIONS

Hakimi, "Taming Momentum in a Distributed Asynchronous Environment", Jul. 2019. (Year: 2019).*
(Continued)

*Primary Examiner* — Dave Misir (57) ABSTRACT

Disclosed embodiments are a computing system and a computer-implemented method for distributed training of a machine learning model over a plurality of computing nodes, in a plurality of iterations, characterized by gradient gap based mitigation of the gradient staleness problem. The disclosed method evaluates the staleness of the gradient based on the difference in gradients between a central point, for example an iteration's common starting point, and the points reached by the respective computing node during one or more iterations, and aggregates the update steps from the plurality of computing nodes, while giving more weight to computing nodes having a lesser change in the gradient.

11 Claims, 6 Drawing Sheets

(56) References Cited

U.S. PATENT DOCUMENTS

2019/0303787 A1* 10/2019 Dube ................... G06N 20/00
2019/0325302 A1* 10/2019 Savic .................. G06N 3/0454
2020/0004801 A1* 1/2020 McMahan ............... G06F 17/11

OTHER PUBLICATIONS

Hakimi, "DANA: Scalable Out-Of-The-Box Distributed ASGD Without Retuning", Sep. 2018. (Year: 2018).*
International Search Report and the Written Opinion dated Feb. 8, 2021 From the International Searching Authority Re. Application No. PCT/IL2020/051154 (8 Pages).
Barkai et al., "Gap-Aware Mitigation of Gradient Staleness", ArXiv Preprint ArXiv: 1909.10802v2, p. 1-29, Sep. 25, 2019.
Zhang et al., "Staleness-Aware Async-SGD for Distributed Deep Learning". ArXiv Preprint ArXiv:1511.05950v5, pp. 1-7, Nov. 18, 2015.

* cited by examiner

GAP-AWARE MITIGATION OF GRADIENT STALENESS

RELATED APPLICATIONS

This application is a National Phase of PCT Patent Application No. PCT/IL2020/051154 having International filing date of Nov. 5, 2020, which claims the benefit of priority under 35 USC § 119(e) of U.S. Provisional Patent Application No. 62/930,633 filed on Nov. 5, 2019. The contents of the above applications are all incorporated by reference as if fully set forth herein in their entirety.

BACKGROUND

Some embodiments relate to training machine learning models and, more specifically, but not exclusively, to distributed iterative training of machine learning models, using gradient descent on a network of computing nodes.

Machine learning modes became ubiquitous, due to their ability to solve a plurality of problems, which were not effectively solved using rule based methods. Machine learning models are trained on sample data before becoming operative, and the size, complexity and the likes of both the machine learning models and the training dataset tend to increase rapidly. Stochastic gradient descent (SGD) is a method of updating parameter models iteratively according to the gradient of a target, or loss function, based on the desired model properties.

One way of mitigating the complexity, and increasing requirements for fast access memory, processing resources and the like is distributing the training over a plurality of computing nodes.

When the training is distributed the need to coordinate and exchange information between computing nodes may rise. The update of the machine learning model parameter maintained by a node may be viewed as a movement in a multidimensional space. Some methods aggregate these movements after a measure of time has elapsed, a number of iterations, or the like.

However, several problems arise when synchronizing between the different computer nodes.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

It is an object of the present disclosure, in some embodiments thereof, to provide a system and a method for efficient mitigation of the gradient staleness problem, based on the target or goal function gap, or gradient gap between points reached by the update steps calculated by computing nodes to a reference point.

The foregoing and other objects are achieved by the features of the independent claims. Further implementation forms are apparent from the dependent claims, the description and the figures.

According to a first aspect of some embodiments of the present invention there is provided a system for distributed training of a machine learning model over a plurality of computing nodes, comprising:

a master computing node configured to control a training of a machine learning model during a plurality of training iterations, wherein the following is performed in each of the plurality of iterations:

instructing each of a plurality of slave computing nodes to train a respective local copy of the machine learning model, locally stored on each respective slave computing node, by locally computing a respective update step on a plurality of parameters of the machine learning models, based on at least one locally calculated gradient.

obtaining one or more respective update steps from each of the plurality of slave computing nodes;

creating an updated machine learning model by merging the machine learning model with an aggregation function comprising weights, which are a substantially decreasing function of a change magnitude in at least one substantially compatible gradient at a point indicated by the respective update step; and instructing at least one of the plurality of slave computing nodes to apply a copy of the updated machine learning model in a following training iteration.

According to a second aspect of some embodiments of the present invention there is provided a computer implemented method for distributed training of a machine learning model over a plurality of computing nodes, the plurality of computer nodes comprising a master computing node configured to control a training of a machine learning model during a plurality of training iterations, wherein the following is performed in each of the plurality of iterations:

instructing each of a plurality of slave computing nodes to train a respective local copy of the machine learning model, locally stored on each respective slave computing node, by locally computing a respective update step on a plurality of parameters of the machine learning models, based on at least one locally calculated gradient;

obtaining one or more respective update steps from each of the plurality of slave computing nodes;

creating an updated machine learning model by merging the machine learning model with an aggregation function comprising weights, which are a substantially decreasing function of a change magnitude in at least one substantially compatible gradient at a point indicated by the respective update step; and instructing at least one of the plurality of slave computing nodes to apply a copy of the updated machine learning model in a following training iteration.

According to a third aspect of some embodiments of the present invention there is provided a computer program product for distributed training of a machine learning model over a plurality of computing nodes, the computer program product comprising a non-transitory computer readable storage medium having:

first program instructions for instructing each of a plurality of slave computing nodes to train a respective local copy of the machine learning model, locally stored on each respective slave computing node, by locally computing a respective update step on a plurality of parameters of the machine learning models, based on at least one locally calculated gradient;

second program instructions for obtaining one or more respective update steps from each of the plurality of slave computing nodes;

third program instructions for creating an updated machine learning model by merging the machine learning model with an aggregation function comprising weights, which are a substantially decreasing function of a change magnitude in at least one substantially compatible gradient at a point indicated by the respective update step; and fourth program instructions for instructing at least one of the plurality of slave computing nodes to apply a copy of the updated machine learning model in a following training iteration.

Optionally, the at least one gradient computed by each of the plurality of computers is computed by applying a stochastic gradient descent for minimizing a loss function for the respective local copy.

Optionally, the weighted function is averaging of the update steps.

Optionally, at least one of the weights is a constant divided by the difference between the gradient at a central point and the gradient at a point based on the respective update step.

Optionally, the change magnitude is measured between the at least one gradient at a central point and the at least one gradient at a point indicated by the respective update step, the central point is determined by the weighted function computed during the previous training iteration.

Optionally, each of the plurality of slave computing nodes uses a subset of a training dataset for calculating the value of the update steps by training the respective local copy.

Optionally, the update step is further based on hyperparameters comprising learning rate, and the learning rate is adjusted according to a gradient convergence measure.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, scripting languages such as Python, Perl or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments relate to training machine learning models and, more specifically, but not exclusively, to distributed iterative training of machine learning models, using gradient descent on a network of computing nodes.

Machine learning models, in particular, those used for computer vision tasks such as video or image analysis, such as detection, classification, automatic identification of emergency occurrences, segmentation, and the like, may require many resources, especially for training. Complex natural language processing (NLP) tasks, voice analysis, and the like may also be slow to train on a single machine, and the enhancement obtainable by parallel computing may be desirable.

Synchronous SGD (SSGD) is a method used to distribute the learning, or the training process across multiple computing nodes. The major drawback of SSGD is that its speed is confined to the slowest worker in every iteration, which may be a problem when computing nodes vary in their capabilities.

In asynchronous SGD (ASGD), each computing node communicates independently of the others, thereby addressing the major drawback of SSGD. ASGD enjoys linear speedup in terms of the number of workers, even on non-dedicated networks. This makes ASGD a potentially better alternative to SSGD when using cloud computing. Unfortunately, ASGD also has a significant weakness known as gradient staleness; the gradients used to update the parameter server's (master) parameters are often based on older parameters and therefore may be inaccurate, severely hindering the convergence process and reaching reduced final accuracy.

Reference is made to "Staleness-aware async-sgd for distributed deep learning" by Wei Zhang, Suyog Gupta, Xiangru Lian, and Ji Liu. CoRR, abs/1511.05950, 2015b. This publication discloses a mothed, referred to as staleness aware (SA) that penalizes the step size of stale gradients linearly to their delay, and is hereby incorporated by reference. Unfortunately, this method suffers from a degradation of the final accuracy, especially when scaling up the number of workers.

The disclosure comprises a method to mitigate gradient staleness while minimizing the degradation of final accuracy, by defining a measure of gradient staleness, referred to as the Gap. The Gap is based on the difference between the parameters used to calculate the gradient and the parameters on which the gradient is applied. The disclosure comprises a new method, which may be referred to as Gap-Aware (GA), which penalizes the step size of stale gradients linearly to their Gap, while eliminating the over-penalization or under-penalization of SA.

An intuitive method to measure gradient staleness would be: $\nabla f(\theta k) - \nabla f(\theta_{k-\tau k})$, wherein f is the goal or cost function, $\theta k$ is the machine learning model parameter set in the iteration beginning and $\tau k$ is the delay. This essentially measures the difference between the stale gradient and the accurate gradient that is computed on the up-to-date parameters. Some deep learning methods apply the Lipschitzian gradients assumption:

$\|\nabla f(x) - \nabla f(y)\| \le L \|x-y\|$ wherein x,y,L are real numbers

Setting $x=\theta k$; $y=\theta_{k-\tau k}$ into this equation we get:

$$\|\nabla f(\theta k) - \nabla f(\theta_{k-\tau k})\| \le L \|\theta_k - \theta_{k-\tau k}\|$$

This implies that $\|\theta_k - \theta_{k-\tau k}\|$ denotes a valid upper bound of the gradient staleness. The quantity $\|\theta_k - \theta_{k-\tau k}\|/C+1$ where C may denote a constant representing the maximal distance the parameters can travel in a single update, provided the gradient norms meets certain conditions. Alternatively various gradient norms such as full model, layer-wise and parameter-wise may be used and bound may differ accordingly. To mitigate the gradient staleness, while eliminating the over-penalization and under-penalization, some implementation may divide the gradients themselves by their respective Gap. This method may be referred to as Gap-Aware (GA).

The following table shows experiments results on the ImageNet dataset using the ResNet-50 model, using an exemplary implementation of the disclosure compared to alternative methods of distributed training of machine learning models.

| N | ASGD | NAG- | SA | GA | DANA | DANA- | DANA- |
|---|------|------|-----|------|------|-------|-------|
| 32 | 70.53 | 70.64% | 61.73 | 70.27 | 74.89 | 65.66% | 75.06% |
| 48 | 69.05 | 66.78% | 56.22 | 67.75 | 73.75 | 61.16% | 74.23% |
| 64 | 67.1% | 59.81% | 50.79 | 64.78 | 69.88 | 56.98% | 74.11% |
| 128 | NaN | NaN | NaN | NaN | NaN | NaN | 72.18% |

Every asynchronous slave computing node in this embodiment is a machine with 8 GPUs, so the 128 workers in our experiments simulate a total of 1024 GPUs.

Experiments showed improvement in the final test error, train error, and convergence speed of different cluster sizes, validating that penalizing linearly to the Gap is the factor that leads to better performance. The gap, used in the disclosed GA method, is an example of a gradient, or a loss function value based measure of gradient staleness, rather than the magnitude of the parameter change. The same hyper-parameters across all the tested algorithms.

The table shows that the disclosed GA out-performs alternative methods such as SA due to the high number of workers, which exacerbates the over-penalizing of SA. Therefore, the disclosure enables use of larger networks of computing nodes, without losing performance due to the synchronization overhead of SSGD, and effectively mitigating the stale gradient problem of ASGD, on image classification tasks. The disclosure was also tested on a language-modeling task using the WikiText-103 corpus. The improvement in gradient staleness measuring effectiveness provided by the gap aware (GA) algorithm, and may also be provided on other loss or target function values, gradients, or other derivatives, enables better training speed and model quality using the same computing network, and may be functional in cases where ordinary ASGD fails to converge due to the gradient staleness problem.

The improvement in the capacity and speed of distributed training of complex machine learning models, provided by the disclosed GA method, enables more rapid update of computer vision models, natural language processing, voice analysis, anomaly detection models used for example for cyber threat mitigation, and the like.

Figure 1A:
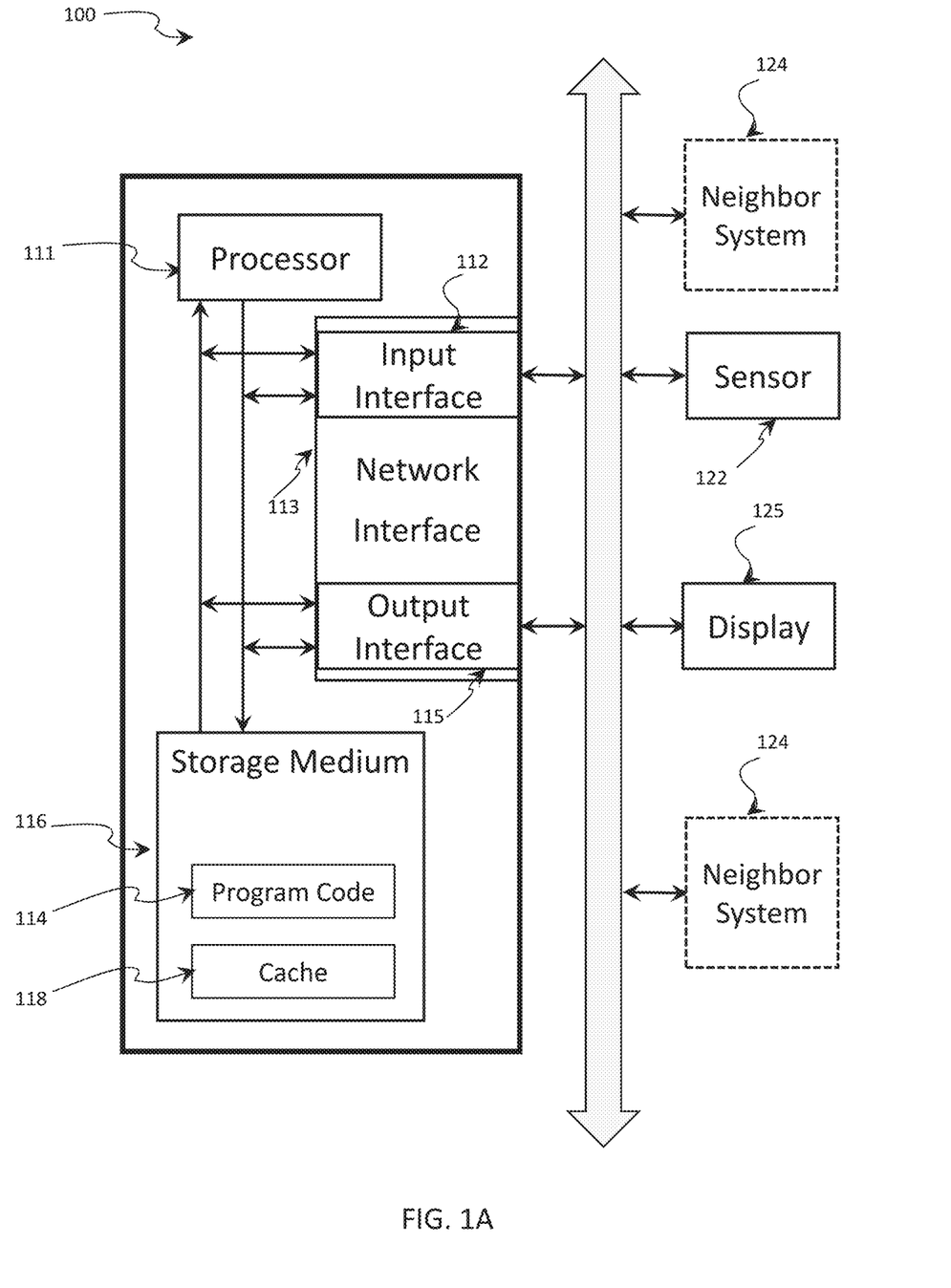
FIG. 1A is a schematic illustration of an exemplary computing node, according to some embodiments of the present disclosure.

Reference is now made to FIG. 1A, which is a schematic illustration of an exemplary computing node, according to some embodiments of the present disclosure.

Figure 2:
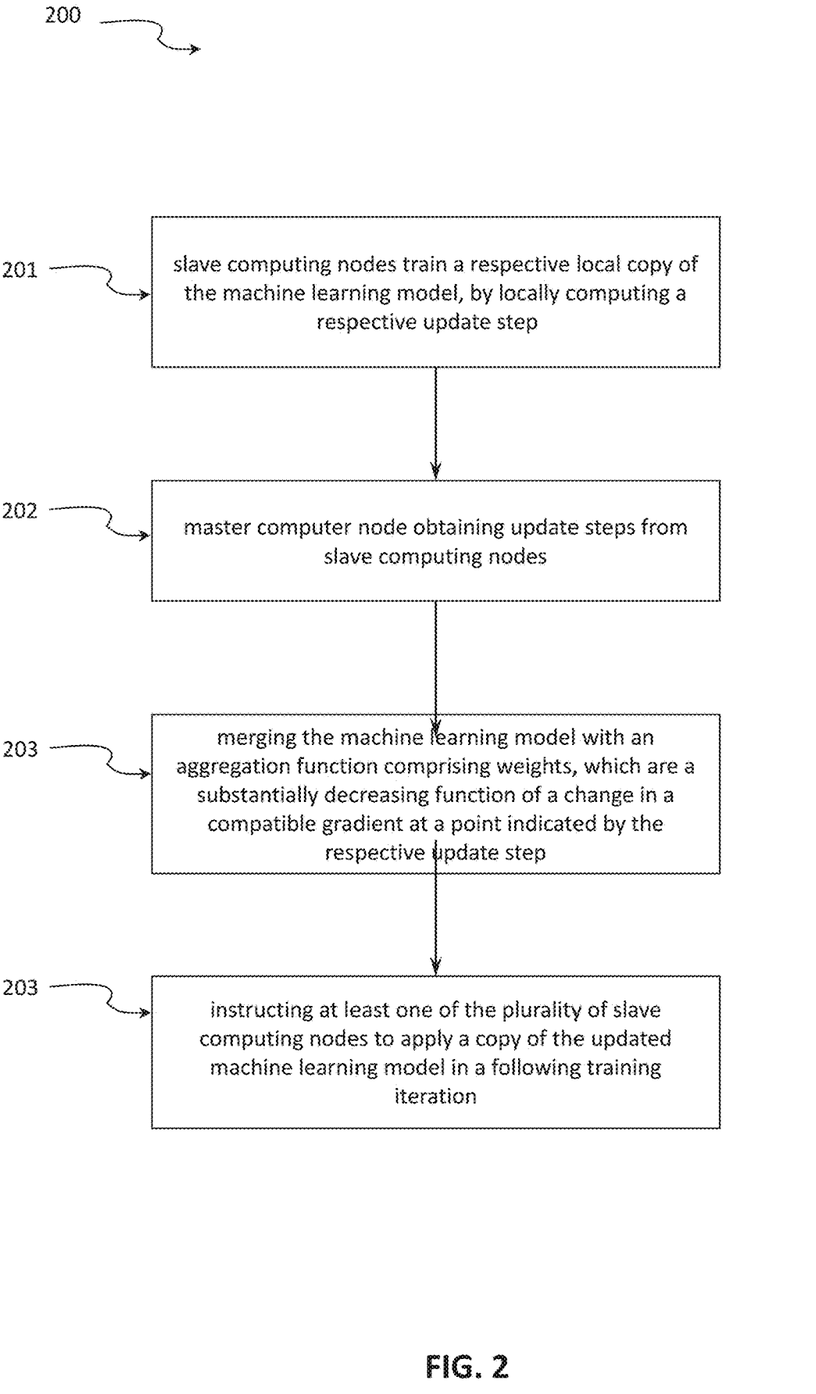
FIG. 2 is a flowchart of an exemplary process for an iteration of distributed training of machine learning models, according to some embodiments of the present disclosure.

The exemplary computing node 100 may be a master computing executing processes, such as processes 200, which is described in FIG. 2, and may be applied for many machine learning models, training datasets, learning policies, and the like. The exemplary computing node may also be a slave computing node, executing training and communicating with the master computing node.

The computing node 100 may include an input interface 112, an output interface 115, a processor 111, and a storage medium 116 for storing a program code 114, a cache 118 for storing data such as corrective factors associated with tuples of clusters, or cluster level corrective factors, and/or additional data. The processor 111 may execute code from the program code 114 for implementing process 200, which is described in FIG. 2.

Additionally, the computing node 100 may be implemented on a mobile device, a programmable cellular phone, a tablet, and/or the likes.

Further alternatively, the computing node may comprise dedicated hardware, ASIC, FPGA, and/or the likes. It should be noted that application-specific hardware may account for better speed and lower power consumption, especially for parallel operation frequently used in machine learning models. However, at a potential cost of additional resources required during design and limit flexibility in system updates.

The input interface 112 and the output interface 115 may comprise one or more wired and/or wireless network interfaces for connecting to one or more networks, for example, a local area network (LAN), a wide area network (WAN), a metropolitan area network, a cellular network, the internet and/or the like. The input interface 112 and the output interface 115 may further include one or more wired and/or wireless interconnection interfaces, for example, a universal serial bus (USB) interface, a wireless local area network (WLAN), and/or the like. Furthermore, the output interface 115 may include one or more wireless interfaces for loudspeakers, display, updating of external systems such as image recognition systems, recommender systems, and/or the like, as well as other processors executing post-processing. The input interface 112 may include one or more wireless interfaces for receiving information from one or more devices. Additionally, the input interface 112 may include specific means for communication with one or more sensor devices 122 such as a camera, microphone, keyboard, touchscreen, mouse, scanner and/or the like. The sensor devices 122 may also be used to update configuration, preferences, and/or the like. The input interface may be configured to access a neighbor system 124, in order to receive machine learning model parameters, training data, hyper parameters, and/or the like. The neighbor system 124 may initiate queries, and serve as a master computing node or as an additional slave computing node. The output interface 115 may include specific means for communication with one or more display devices 125 such as a loudspeaker, screen, projector and/or the like. Furthermore, the display device may comprise a model, device, and/or the likes, which executes further processing on indications from the system.

The processor 111 may be homogenous or heterogeneous and may include one or more processing nodes arranged for parallel processing, as clusters and/or as one or more multi-core processors. The storage medium 116 may store training data, machine learning model parameters and structure information, and the like, and include one or more non-transitory persistent storage devices, for example, a hard drive, a Flash array, a removable media, and/or the like. The storage medium 116 may also include one or more volatile devices, for example, a random access memory (RAM) component and/or the like. The storage medium 116 may further include one or more network storage resources, for example, a storage server, a network attached storage (NAS), a network drive, and/or the like, accessible via one or more networks through the input interface 112 and the output interface 115. Both the program code 114, and cache 118 may be stored completely or partially on a processor cache for speed, however since the storage size limits may be tighter there, and operating systems may impose limitations on processor cache allocation, the cache may be stored in physical or virtual memory, which may comprise memory modules, solid state drives (SSD), hard drives and/or other computing devices. Furthermore, faster access storage hardware such as dedicated registers, latches, caches, context addressable memory, and/or the likes may be used to enhance processing speed. Data that has to be accessed frequently such as parameters of cluster partitions, the set comprising geographic locations, the assignment of geographic locations to clusters, may be stored using faster access devices, such as caches or video random memory (VRAM), while data that is accessed rarely such as corrective factors for tuples comprising sparsely populated regions, road layouts of rural outskirts and/or the likes may be stored using slower, yet more flexible and inexpensive means such as a network attached storage, a cloud service, and/or the like.

Figure 1B:
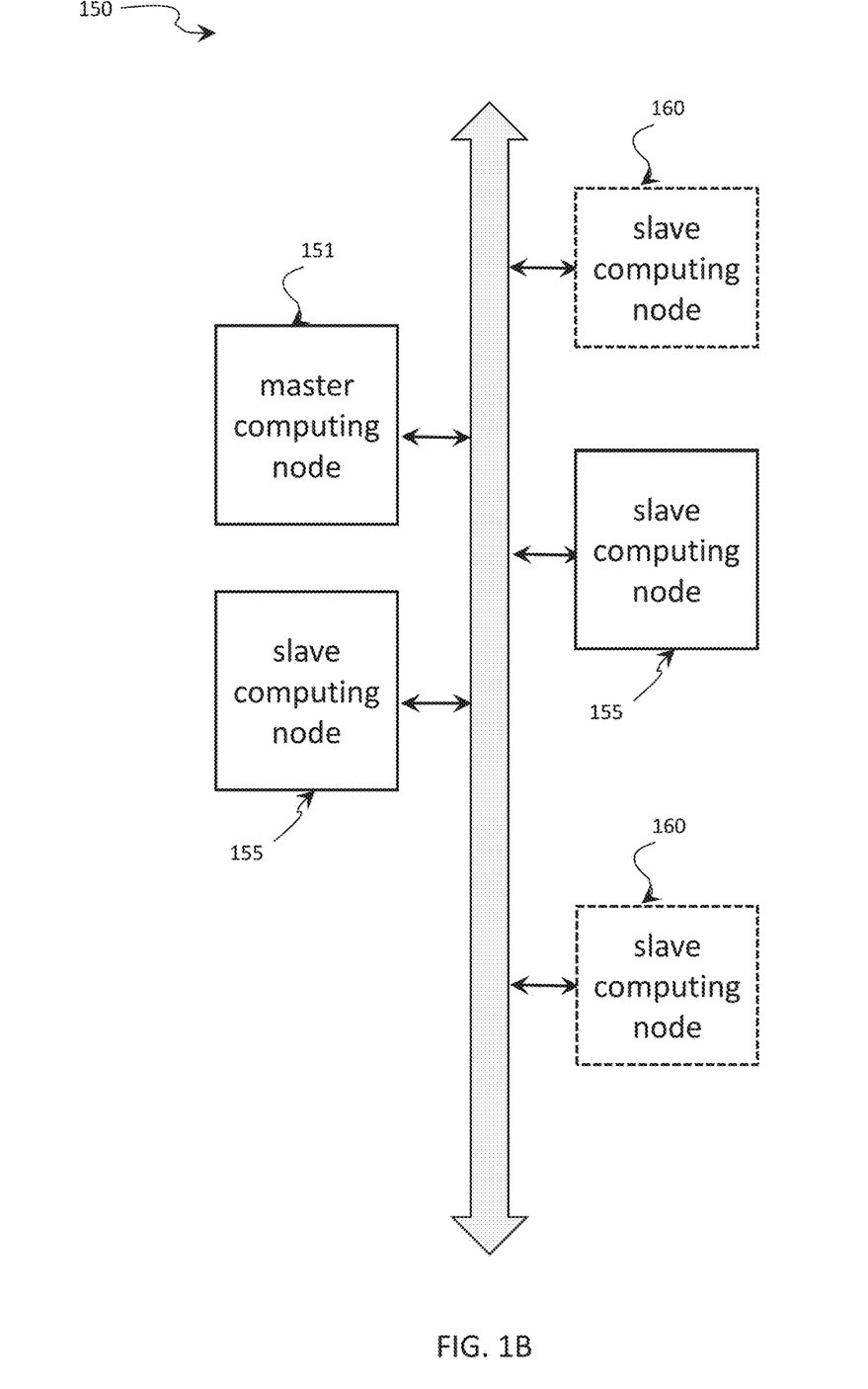
FIG. 1B is a schematic illustration of an exemplary system for distributed training of machine learning models, according to some embodiments of the present disclosure.

Reference is now made to FIG. 1B which is a schematic illustration of an exemplary system for distributed training of machine learning models, according to some embodiments of the present disclosure.

System for 150 may be implemented on one or more computers, compute server, and or the likes, physically located on a site, and/or implemented, as a distributed system, virtually on a cloud service, on machines also used for other functions, and/or by several other options.

The system comprises at least one master computing node shown in 151 used to manage the training process and aggregate update steps received from slave computing nodes shown on 155. An additional plurality of slave computing nodes 160 may be available throughout one or more iterations and dynamically allocated.

Systems such as 150 may be optimized for distributed training of a machine learning models over a plurality of computing nodes, where a node is assigned as a master computing node, configured to control a training of a machine learning model during a plurality of training iterations.

Reference is now made to FIG. 2, which is a flowchart of an exemplary process for an iteration of distributed training of machine learning models, according to some embodiments of the present disclosure. The processor 111 may execute the exemplary process 200 for training machine learning models for a variety of purposes. Alternatively, the process 200 or parts thereof may be executed using a remote system, an auxiliary system, and/or the like.

The exemplary process 200 starts, as shown in 201, with slave computing nodes train a respective local copy of the machine learning model, by locally computing a respective update step.

Preparations may comprise transmitting a copy of a machine learning model, or parts thereof to the slave computing nodes, which may store a local copy. The master computer mode may instruct the slave computing nodes to update parameters by transmitting new parameters, or according to a policy.

The master computing node may instruct some, or each of a plurality of slave computing nodes to train their respective local copy of the machine learning model, locally stored on each respective slave computing node, by locally computing a respective update step on a plurality of parameters of the machine learning models, based on at least one locally calculated gradient.

There is a plurality of iterative training methods. The disclosure is best compatible with gradient based methods, therefore in some implementations the at least one gradient computed by each of the plurality of computers is computed by applying a stochastic gradient descent for minimizing a loss function for the respective local copy. Other iterative training methods such as genetic algorithms may also be used, or combined with a gradient-based method.

The distributed training is best achieved when each of the plurality of slave computing nodes executes calculations comparatively independent of other computing nodes. For example, a slave computing node may use subset of a training dataset for calculating the value of the update steps by training the respective local copy. Alternatively, a slave computing node may execute or update only some parts of the machine learning model, apply different optimization methods, and/or the like.

The exemplary process 200 continues, as shown in 202, with Master computer node obtaining update steps from slave computing nodes. The communication for obtaining one or more respective update steps from each of the plurality of slave computing nodes may be initiated either by the master computing node, based for example on a time limit, the slave computing nodes, for example by completing a number of epochs, or by both the master and the slave computing nodes.

The exemplary process 200 continues, as shown in 203, with merging the machine learning model with an aggregation function comprising weights, which are a substantially decreasing function of a change in a compatible gradient at a point indicated by the respective update step.

The change magnitude, may be measured between the at least one gradient at a central point and the at least one gradient at a point indicated by the respective update step. The central point may determined by the weighted function computed during the current or previous training iteration. Alternatively, other algorithms may be used to adjust to central point.

The weighted function may be averaging of the update steps. Alternatively, the aggregation may use geometric or multiplicative averaging, logarithmic scale averaging, and/or combinations thereof or the like.

The weights may be a constant divided by the difference between the gradient at a central point and the gradient at a point based on the respective update step. The constant may be based on hyper parameters such as the learning rate and change between iteration, since the learning rate is adjusted according to a gradient convergence measure.

It should be noted the term gradient should be interpreted broadly, and may refer, in addition to the first order gradient to second order gradients such as hessian or Laplacian, to zeroth order gap in the target function, third, or more order derivatives, and the like.

Followingly, the master computing node updates machine learning model by merging the machine learning model with an aggregation function comprising weights, which are a substantially decreasing function of a change magnitude in at least one substantially compatible gradient at a point indicated by the respective update step. The compatible gradient may be the same gradient calculated for the step, however some implementation may use a modified or simplified gradient size measure for this purpose. The decreasing function may be a constant divided by the gradient size measure, however other decreasing functions such as negative exponent may be used.

The exemplary process 200 continues, as shown in 204, with instructing at least one of the plurality of slave computing nodes to apply a copy of the updated machine learning model in a following training iteration.

The master computing node may use the network communication for instructing a slave computing nodes to apply an updated copy of the machine learning model in one or more following training iterations. Some implementation may instruct all the slave computing nodes simultaneously, other implementation may instruct only slave computing nodes having completed the previous iteration, or apply dynamically allocation of computer nodes.

Figure 3:
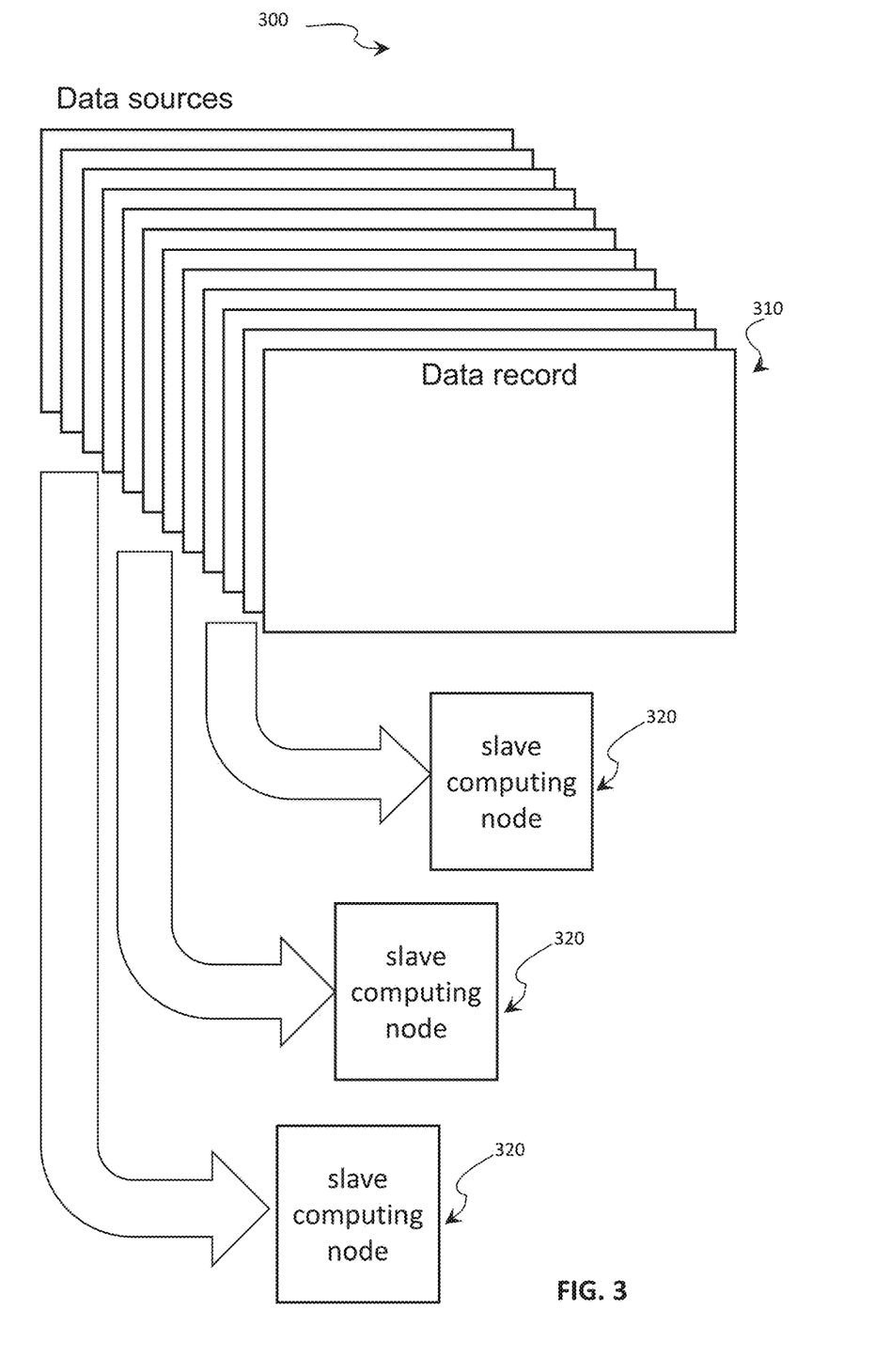
FIG. 3 illustrates partition to subsets of a training dataset, according to some embodiments of the present disclosure.

Reference is now made to FIG. 3, which illustrates partition to subsets of a training dataset, according to some embodiments of the present disclosure.

A method of distributing work between slave computing nodes may be allocating different parts of a dataset shown in 310 to different slave computing nodes shown in 320, as shown in 300.

When different slave computing nodes have different memory size or other computing capability bottlenecks, more data may be allocated to slave computing nodes having more memory, bandwidth, and/or the like.

Some implementations of distributed training of machine learning models may, additionally or alternatively, implement methods of model parallelism or functional decomposition, for splitting the machine learning model to smaller chunks, for example a layer or a smaller stack of layers of a neural network. These implementation may also implement the disclosed GA to regulate propagation of parameter updating between different computing nodes, and fall within the scope of the claims.

Figure 4:
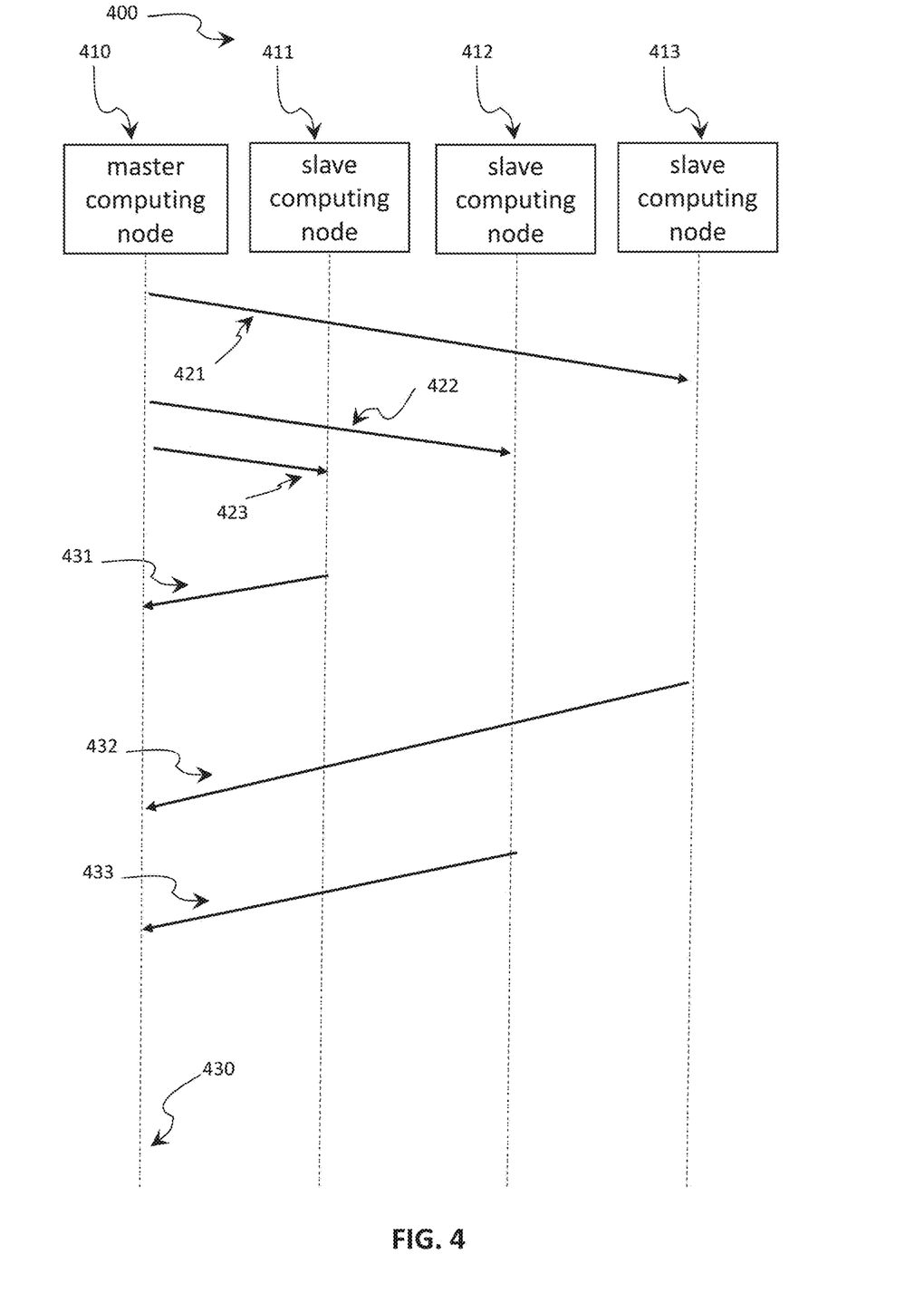
FIG. 4 is a sequence diagram of an exemplary iteration of a process for distributed training of a machine learning model, according to some embodiments of the present disclosure.

Reference is now made to FIG. 4, which is a sequence diagram of an exemplary iteration of a process for distributed training of a machine learning model, according to some embodiments of the present disclosure.

The exemplary sequence diagram 400 exemplifies a sequence of inferences associated with a process such as 200 (shown in FIG. 2). The master computing node 410, which may be similar to 151 shown in FIG. 1B, is connected to three slave computing nodes 411, 412, and 413 which may be similar to 155 shown in FIG. 1B. The timeline is depicted for each agent such as the master computing node as a descending line 430.

The exemplary sequence 400 begins as the master computing node instructs the slave computing node 413 at 421 to train its respective local copy of the machine learning model, by locally computing a respective update step on parameters of the machine learning models, based on at least one locally calculated gradient. The process continues as shown at 422 as the processor similarly instructs the slave computing node 412 and as shown in 423 as the processor similarly instructs the slave computing node 411.

In this example, the slave computing node 411 is the first to update the master computing node enabling the master computing node to obtain one or more respective update steps as shown in 431. Some implementation may immediately create an updated machine learning model by merging the machine learning model with the aggregation function assigning weight by a decreasing function of a change magnitude in at least one substantially compatible gradient at a point indicated by the respective update step. Alternative implementation may aggregate additional update steps before instructing the slave computer node to continue with an updated machine learning model.

Followingly, the slave computing node 413 is the second to update the master computing node enabling the master computing node to obtain one or more respective update steps as shown in 432. Lastly, the slave computing node 412 is the third to update the master computing node enabling the master computing node to obtain one or more respective update steps as shown in 433.

It should be noted that this is an exemplary flow on an exemplary implementation, provided to illustrate an exemplary sequence of communication transactions, and actual flow of events and system behavior may vary.

Figure 5:
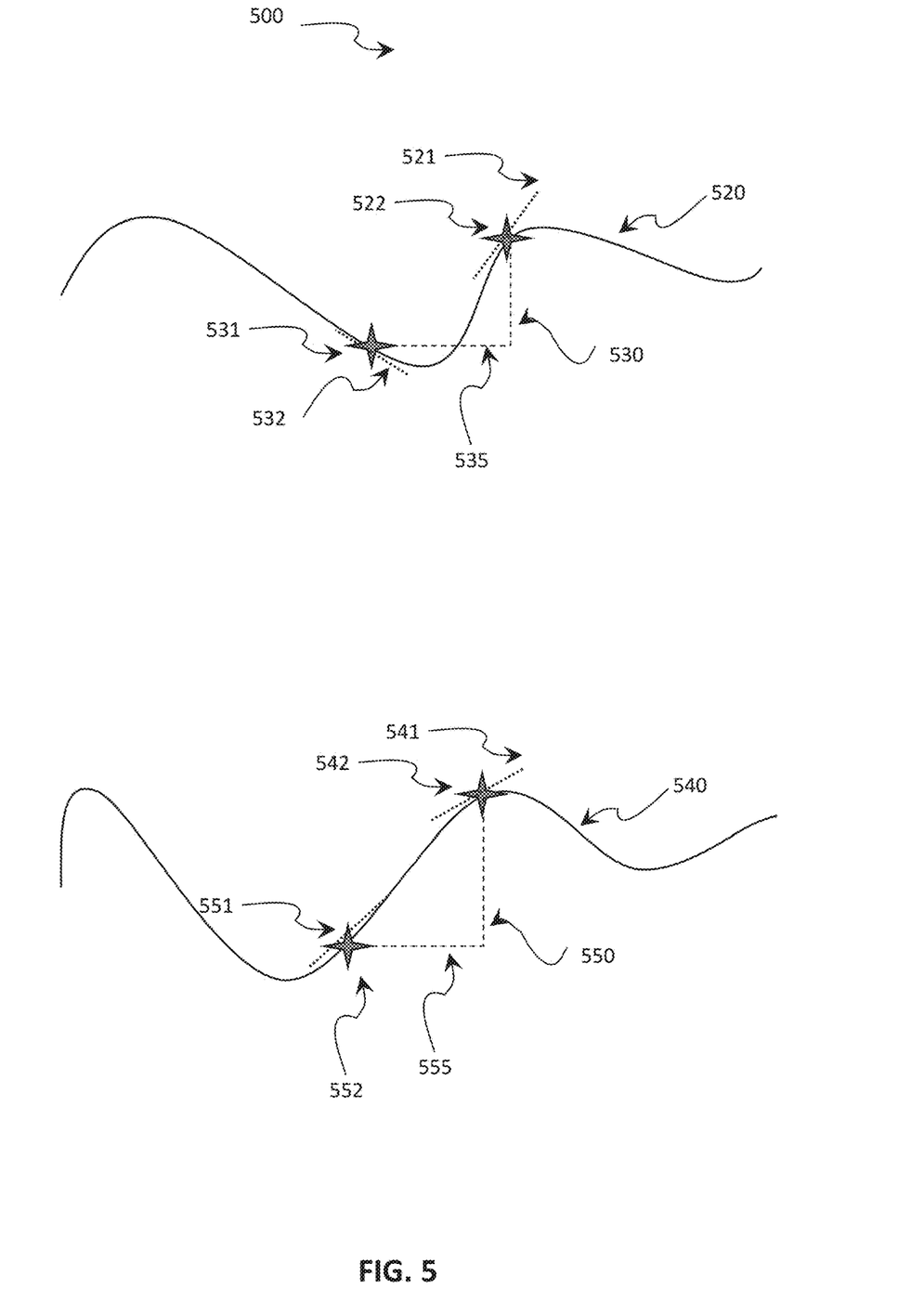
FIG. 5 illustrates an example of the difference between measuring the step size, and measuring gradient difference, according to some embodiments of the present disclosure.

Reference is now made to FIG. 5, which illustrates an example of the difference between measuring the step size, and measuring gradient difference, according to some embodiments of the present disclosure.

The illustration 500 shows two instances of a simplified, one dimensional function, which may correspond to the loss function on which a machine learning is trained, given a value of a parameter comprised by the model.

The graphs 520 and 540 may correspond to different subsets of the training data. The points 522 and 542 may be the starting point of iteration k, on the graphs 520 and 540 respectively and the tangent dotted lines 521 and 541 show the derivative, as a single dimensional gradient.

The points after the update step, which may be the starting point of iteration k+1, are shown in 532 and 552 on the graphs 520 and 540 respectively, and the tangent dotted lines 531 and 551 correspondingly show the derivative.

The vertical dashed lines 530 and 550 show the function value gaps on the graphs 520 and 540 respectively. The gap may be considered as a zeroth order gradient. Similarly, the horizontal dashed lines 535 and 555 show the step size.

Some implementation of SA may use a function of the step size as shown in 535 and 555 to estimate the staleness of the gradient. Some implementations of the disclosed GA may use the function value gap, as shown in 530 and 550 to estimate the staleness of the gradient. Further alternative implementation of the disclosure may additionally or alternatively, use a measure of the gap in the gradient to estimate the staleness of the gradient.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods for querying and supplying geographic information, smart city systems, and the likes will be developed and the scope of the term GIS is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for improving an accuracy of a machine learning model trained using distributed training over a plurality of computing nodes, comprising:
    a master computing node configured to control a training of the machine learning model during a plurality of training iterations, wherein the following is performed in each of the plurality of iterations:
        instructing each of a plurality of slave computing nodes to train a respective local copy of the machine learning model, locally stored on each respective slave computing node, by locally computing a respective update step on a plurality of parameters of the respective local copy of the machine learning model, based on at least one locally calculated gradient;
        obtaining one or more respective update steps from each of the plurality of slave computing nodes;
        creating an updated machine learning model with improved accuracy, by merging respective updated local machine learning models using an aggregation function comprising weights, which are a decreasing function of a change magnitude in at least one gradient at a point indicated by the respective update step; and
        instructing at least one of the plurality of slave computing nodes to apply a copy of the updated machine learning model in a following training iteration;
    wherein at least one of the weights is a constant divided by a difference between the gradient at a central point and the gradient at a point based on the respective update step; and
    wherein the change magnitude is measured between at least one first locally calculated gradient at the central point and at least one second locally calculated gradient at the point indicated by the respective update step, the central point is determined by the aggregation function computed during a previous training iteration.

2. The system of claim 1, wherein the at least one locally calculated gradient computed by each of the plurality of slave computing nodes is computed by applying a stochastic gradient descent for minimizing a loss function for the respective local copy.

3. The system of claim 1, wherein the aggregation function is averaging of the update steps.

4. The system of claim 1, wherein each of the plurality of slave computing nodes uses a subset of a training dataset for calculating a value of the update steps by training the respective local copy.

5. The system of claim 1, wherein the update step is further based on hyper-parameters comprising learning rate, and the learning rate is adjusted according to a gradient convergence measure.

6. A computer implemented method for improving an accuracy of a machine learning model trained using distributed training over a plurality of computing nodes, the plurality of computer nodes comprising a master computing node configured to control a training of the machine learning model during a plurality of training iterations, wherein the following is performed in each of the plurality of iterations:
    instructing each of a plurality of slave computing nodes to train a respective local copy of the machine learning model, locally stored on each respective slave computing node, by locally computing a respective update step on a plurality of parameters of the respective local copy of the machine learning model, based on at least one locally calculated gradient;
    obtaining one or more respective update steps from each of the plurality of slave computing nodes;
    creating an updated machine learning model with improved accuracy, by merging respective updated local machine learning models using an aggregation function comprising weights, which are a decreasing function of a change magnitude in at least one gradient at a point indicated by the respective update step; and
    instructing at least one of the plurality of slave computing nodes to apply a copy of the updated machine learning model in a following training iteration;

wherein at least one of the weights is a constant divided by a difference between the gradient at a central point and the gradient at a point based on the respective update step; and wherein the change magnitude is measured between at least one first locally calculated gradient at the central point and at least one second locally calculated gradient at the point indicated by the respective update step, the central point is determined by the aggregation function computed during a previous training iteration.

7. The computer implemented method of claim 6, wherein the at least one locally calculated gradient computed by each of the plurality of slave computing nodes is computed by applying a stochastic gradient descent for minimizing a loss function for the respective local copy.

8. The computer implemented method of claim 6, wherein the aggregation function is averaging of the update steps.

9. The computer implemented method of claim 6, wherein each of the plurality of slave computing nodes uses a subset of a training dataset for calculating a value of the update steps by training the respective local copy.

10. The computer implemented method of claim 6, wherein the update step is further based on hyper-parameters comprising learning rate, and the learning rate is adjusted downwards according to a gradient convergence measure.

11. A computer program product for improving an accuracy of a machine learning model trained using distributed training over a plurality of computing nodes, the computer program product comprising a non-transitory computer readable storage medium having:

first program instructions for instructing each of a plurality of slave computing nodes to train a respective local copy of the machine learning model, locally stored on each respective slave computing node, by locally computing a respective update step on a plurality of parameters of the respective local copy of the machine learning model, based on at least one locally calculated gradient;

second program instructions for obtaining one or more respective update steps from each of the plurality of slave computing nodes;

third program instructions for creating an updated machine learning model with improved accuracy, by merging respective updated local machine learning models using an aggregation function comprising weights, which are a decreasing function of a change magnitude in at least one gradient at a point indicated by the respective update step; and fourth program instructions for instructing at least one of the plurality of slave computing nodes to apply a copy of the updated machine learning model in a following training iteration;

wherein at least one of the weights is a constant divided by a difference between the gradient at a central point and the gradient at a point based on the respective update step; and wherein the change magnitude is measured between at least one first locally calculated gradient at the central point and at least one second locally calculated gradient at the point indicated by the respective update step, the central point is determined by the aggregation function computed during a previous training iteration.

\* \* \* \* \*